United States Patent [19]
Lenk et al.

[11] Patent Number: 5,637,331
[45] Date of Patent: Jun. 10, 1997

[54] SPIN SYSTEM FOR THERMOPLASTIC YARNS

[75] Inventors: Erich Lenk; Egon Gathmann, both of Remscheid, Germany

[73] Assignee: Barmag AG, Remscheid, Germany

[21] Appl. No.: 325,246

[22] PCT Filed: Feb. 16, 1994

[86] PCT No.: PCT/DE94/00167
§ 371 Date: Jan. 23, 1995
§ 102(e) Date: Jan. 23, 1995

[87] PCT Pub. No.: WO94/19516
PCT Pub. Date: Sep. 1, 1994

[30] Foreign Application Priority Data

Feb. 18, 1993 [DE] Germany .................... 43 04 917.6
Mar. 6, 1993 [DE] Germany .................... 43 07 076.0

[51] Int. Cl.⁶ .................... B29B 13/00; B29C 47/36
[52] U.S. Cl. .................... 425/206; 425/72.2; 425/200; 425/382.2; 425/464
[58] Field of Search .................... 425/72.2, 200, 425/206, 382.2, 382.3, 464

[56] References Cited
U.S. PATENT DOCUMENTS

| | | |
|---|---|---|
| 3,502,033 | 3/1970 | Kaczorowski . |
| 4,253,771 | 3/1981 | Renk . |
| 4,639,205 | 1/1987 | Lim .................... 425/200 |
| 5,354,529 | 10/1994 | Berger et al. . |

FOREIGN PATENT DOCUMENTS

| | | |
|---|---|---|
| 1160385 | 7/1958 | France . |
| 1 236 479 | 3/1967 | Germany . |
| 1 908 207 | 9/1970 | Germany . |
| 1 660 674 | 4/1971 | Germany . |
| 20 30 756 | 12/1971 | Germany . |
| 2 040 919 | 2/1972 | Germany . |
| 1 966 565 | 4/1973 | Germany . |
| 1 557 063 | 9/1973 | Germany . |
| 348 772 | 10/1960 | Switzerland . |
| 74 103 045 | 4/1986 | Taiwan . |
| 870019 | 6/1961 | United Kingdom . |
| 893059 | 4/1962 | United Kingdom . |
| 926799 | 5/1963 | United Kingdom . |

*Primary Examiner*—Jill Warden
*Assistant Examiner*—E. Leigh Dawson
*Attorney, Agent, or Firm*—Bell. Seltzer, Park & Gibson, P.A.

[57] ABSTRACT

A spin system for thermoplastic yarns is provided with a melt line, in which the main flow of the melt is transported to a distributor pump. The distributor pump comprises several individual pumps, which divide the main melt flow into several partial flows. Each partial melt flow is supplied to a spinneret. Arranged on one of the driven shafts of the pump are mixing elements. The main melt flow is supplied to the pump via a chamber, in which these mixing elements are arranged.

7 Claims, 2 Drawing Sheets

SPIN SYSTEM FOR THERMOPLASTIC YARNS

BACKGROUND OF THE INVENTION

This invention relates to a spin system for thermoplastic yarns as well as a multiple gear pump with several pairs of gears. Such a spin system and multiple gear pump are known from U.S. Pat. No. 3,502,033, as well as DE 19 08 207. In the spinning of thermoplastic yarns, which consist of individual filaments, the thermoplastic material, for example, polyethylene therephthalate, nylon 6, and nylon 6.6, are melted by an extruder, mixed, and then extruded under a high pressure from the main melt flow. This main melt flow is subsequently divided into several partial melt flows. Each partial melt flow is advanced to a spinneret, from which a plurality of filaments is spun. Thereafter, bundles of filaments are combined to yarns.

For the quality of the product, it is of decisive importance that the filaments between one another have the same properties. For this reason, special importance is attached to the temperature control in the melt line, which guides the main melt flow, and in the so-called spin head, in which the main melt flow is divided into partial melt flows, and in which the partial melt flows are transported to the spinnerets. Likewise of great importance is the uniform advance of all partial melt flows. For this reason, it is customary to install a multiple gear pump in the spin head. This multiple gear pump receives the main melt flow on the one hand. In the pump, the melt main flow is divided into partial melt flows. The multiple gear pump possesses several individual pumps, which serve each the purpose of pumping a partial melt flow under a constant pressure and under the same pressure from individual pump to individual pump. It is therefore normal that these individual pumps are driven by a common drive shaft for all pumps. Known and standard is further the use of gear pumps because of the constancy of the delivery volume and delivery pressure.

Despite all efforts made to control the temperature and to meter of main melt flow and partial melt flows, differences between individual filaments are found over and over again.

In fact, attempts have become known from time to time, which had been directed to make the temperature control of the main melt flow uniform by mixing. To this end, the mixer disclosed in DE 12 36 479 B is used. Likewise known are many types of mixers, which are arranged on the extruder or installed as independent mixers in the melt flow (DE 20 30 756 C; U.S. Pat. No. 4,253,771; DE 20 40 919 A). However, these measures have been unable to eliminate the particularly serious problems of a uniform control of viscosity and temperature in the spinning of multifilament thermoplastic yarns. Likewise, it has not been possible to accomplish this by a mixer arranged upstream of the nozzle plate, such as is known from DE 16 60 674 A.

It is the object of the present invention to eliminate such differences in temperature and viscosity.

This object is accomplished by a spin system including a melt line transporting a main melt flow from an extruder, and a distributor pump which divides the main melt flow into partial melt flows for distribution to a spinneret. The distributor pump is preferably a multiple gear pump having several planetary shafts driven by a common drive shaft. One of the shafts extends into a mixing channel immediately upstream of the distributor pump and is provided with mixing elements. Accordingly, the melt is mixed to reduce any temperature gradients just before the main melt flow is divided into the partial melt flows.

BRIEF DESCRIPTION OF THE DRAWINGS

In the following an embodiment of the invention is described with reference to FIGS. 1–3. In the drawing.

DETAILED DESCRIPTION OF THE INVENTION

Figure 2:
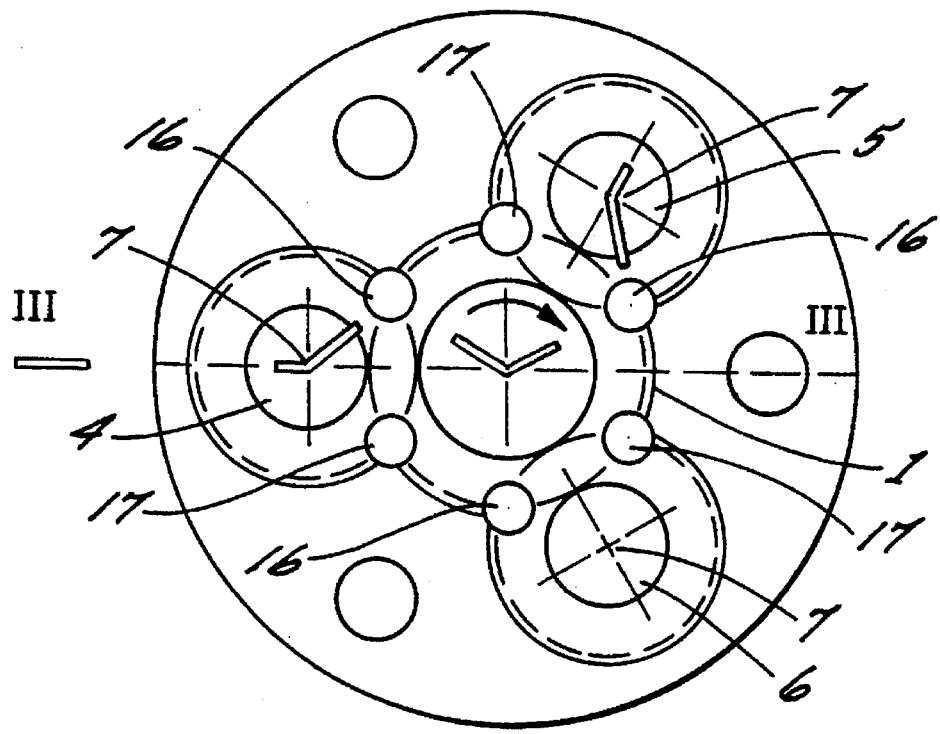
FIG. 2 is a schematic top view.

To put the invention to practice, it is preferred to use gear pumps. The gear pump as illustrated comprises a sun gear 1. The sun gear 1 is driven by a common shaft 2. The drive side is identified by a keyway 3. The sun gear 1 meshes with three planetary gears 4, 5, 6. The planetary gears are distributed over the circumference, each offset by 120°. The planetary gears are supported for free rotation about shafts 7. This arrangement results in three sets of paired gears, each consisting of sun gear 1 and one planetary gear. Each of these paired gears forms an individual pump.

Figure 1:
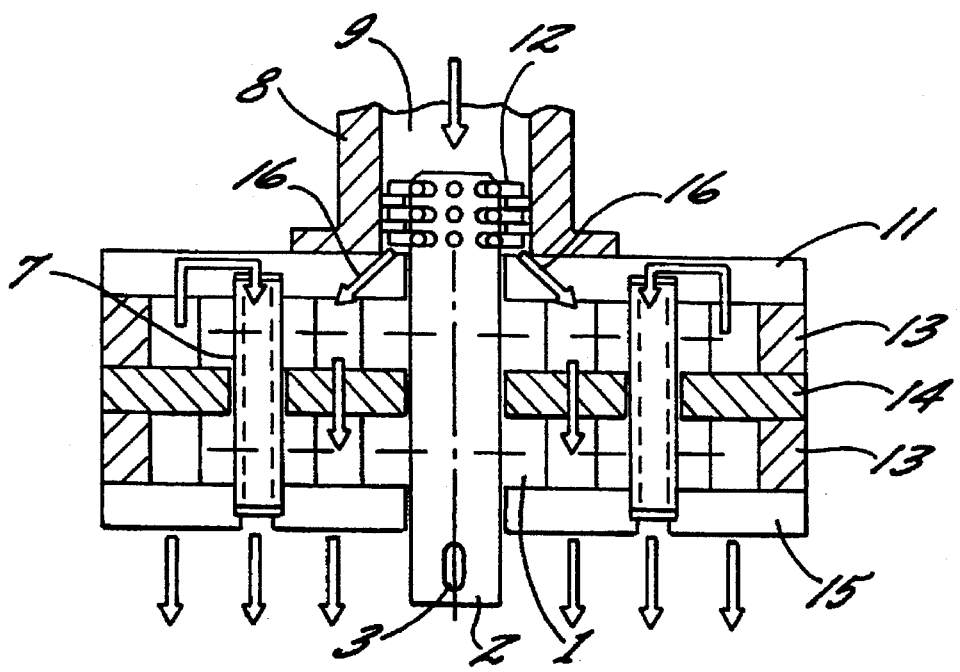
FIG. 1 is a sectional view of a multiple gear pump in several axial planes.

Shown in FIG. 1 is a so-called "six-gear pump", inasmuch as common shaft 2 drives a second set of gears, which consists likewise of a sun gear 1 and planetary gears 4, 5, 6. For the sake of clarity, it should be noted that corresponding gears of the two sets of gears are supported coaxially. The two sets of gears extend through housing plates 13. These housing plates 13 are provided with cutouts, in which the sun gear and the planetary gears are arranged. The two sets of gears are separated from one another by an intermediate plate 14. The two sets of gear pumps are closed, each on their other end side, by cover plates 11 and 15.

The main flow of the thermoplastic melt advancing from the extruder through a melt line 8 enters first into an inlet chamber 9 (within the scope of the present application also named mixing chamber and distributor chamber). The inlet chamber is aligned with one of the pump shafts in or preceding one of cover plates 11 or 15. These pump shafts may be shafts 7, on which the pinions (planetary gears 4, 5, 6) are nonrotatingly supported in this instance, and which are rotatably supported in the housing. In the illustrated embodiment, it is however the drive shaft 2. To this end, the drive shaft is lengthened, so as to extend beyond the housing width between cover plates 11 and 15. Other than in pump layouts known until now, the drive shaft 2 extends through the entire housing, and projects with its end facing away from its drive side into inlet chamber 9. Thus, inlet chamber 9 terminates centrically upstream of housing cover 11. The end of the drive shaft projecting into inlet chamber 9 is described in the present application as mixing end or mixer shaft 12. The inlet chamber/mixing chamber 9 may extend in cover plate 11, and to this extent, it may form an integral part of the pump itself. As illustrated in the embodiment of FIG. 1, the inlet chamber/mixing chamber 9 forms a part of melt supply line 8, which is located, for example, in the pump block, to which the pump is attached by flanges.

From mixing chamber 9 distribution channels 16 extend. These distribution channels 16 extend through cover plate 11, each leading to the inlet channel 16 of each set of paired gears. The inlet channels of the front set of gears, which is adjacent to cover plate 11, also extend through intermediate plate 14 in alignment therewith, so as to reach respective inlets of the second set of gears. Likewise, an outlet channel 17 proceeds from each set of paired gears comprising sun gear 1 and one of the planetary gears 4. The outlet channels of the front set of gears, which is adjacent to cover plate 11, leave this set of gears via shafts 7 of planetary gears 4 or 5 or 6. The outlet channels 17 of the second set of gears extend directly through cover plate 15. The exact spatial location of the inlet and outlet channels is not shown in the Figures. It is however known from the prior art, and not shown here in more detail, since it is not subject matter of this invention. In particular, it is also possible to arrange the outlets on the inlet side. The purpose is to show here only that the invention is to be applied to multiple gear pumps of any design, provided the condition is met that the multiple gear pump be operated by a common drive shaft. The mixing shaft 12 or the mixing area of drive shaft 2 may also be arranged on the drive side. This arrangement may be suitable for reasons of installation, but has the disadvantage that it will require additional seals. In comparison therewith, the layout in accordance with the illustrated embodiment has the advantage that the advance of the main melt flow is not hindered by the technical conditions of the drive. As a result, the function of the inlet chamber, namely to serve simultaneously as a mixing chamber and a distributor chamber, can be satisfactorily realized in this instance.

The mixing end 12 of the drive shaft is provided with suitable mixing elements. As is shown in the embodiment, pins project radially from the drive shaft and the cylindrical walls of the mixing chamber. These pins are arranged in alternating normal planes. These pins which "pass by" relative to one another, perform a thorough mixing of the main melt flow advancing under pressure through the mixing chamber, before is its divided into partial melt flows. Likewise, other mixing elements on mixing segment 12 of drive shaft 2 and/or on the walls of the mixing chamber are conceivable and described in the prior art.

The use of the drive shaft as a mixing shaft and the intensive mixing of the main melt flow directly before it is divided into partial melt flows causes that all cross sectional areas of the main melt flow are mixed with one another. It is precluded that possible viscosity and temperature gradients become again noticeable between the individual cross sectional areas upon dividing the main melt flow into partial flows. It is thus accomplished that all partial melt flows are homogeneous not only in themselves, but also between one another, and that they have a uniform temperature and viscosity.

Figure 3:
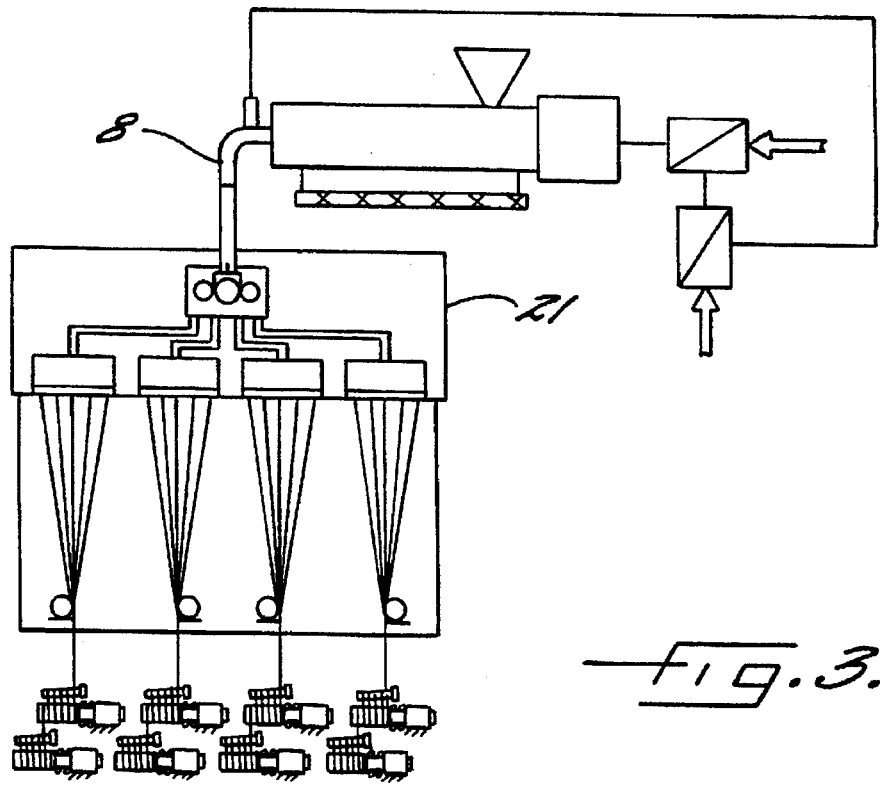
FIG. 3 is a schematic view of a spin system.

Illustrated in FIG. 3 is a spin system. Same comprises an extruder, in which a thermoplastic material is melted and discharged under pressure into the melt line 8. The melt line leads into the spin head. In the spin head, the melt line is connected to the multiple gear pump in accordance with this invention, and the main melt flow is divided by this pump into partial flows. Each partial melt flow is then supplied to a spinneret. From the spinneret, a plurality of multifilament yarns is spun. Each yarn is withdrawn by a godet and subsequently processed and/or wound.

Figure 4:
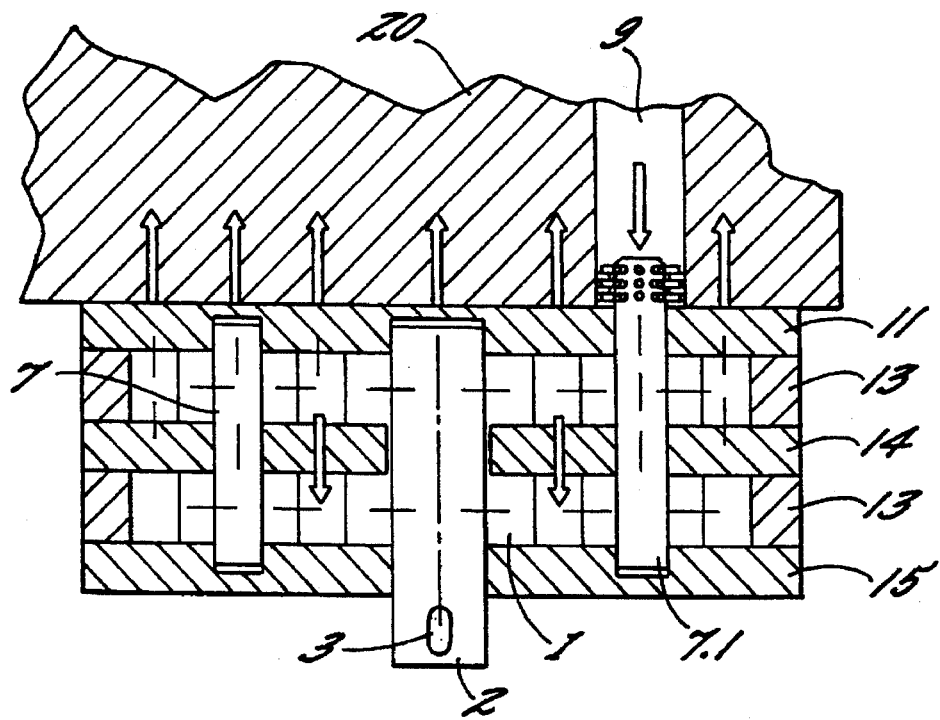
FIG. 4 is a sectional view of a multiple gear pump according to another embodiment of the invention.

Shown in FIG. 4 is a multiple gear pump, which corresponds to the embodiment of FIGS. 1–2, except the following deviations. With the exception of these deviations, the description of FIGS. 1–2 is herewith incorporated by reference. The drive shaft terminates in a blind hole in housing cover 11. The pump is flanged to a pump block 20. The pump block with the pump flanged thereto is arranged in spin box 21 of FIG. 3. The so-called planetary gears are nonrotatingly supported on their respective shafts 7. The shafts 7 are again rotatably supported in housing plates 11, 14, 15. A shaft 7.1 projects from the housing, namely from cover plate 11, and extends into inlet channel 9. The last segment of inlet channel 9 forms the mixing chamber, which is located in this instance exclusively in the pump block. The peripheral wall of the mixing chamber and/or shaft 7.1 are provided with mixing elements of a known design, in the present embodiment pins. From mixing chamber 9, distributor channels branch off, which extend to the inlet end of each pump pairing. In this embodiment, all outlet channels are arranged on the flange side of the pump and extend through the pump block to the individual spinnerets shown in FIG. 3.

We claim:

1. A spin system for thermoplastic yarns, comprising:

a melt line in which a main flow of a thermoplastic melt is transported under pressure from an extruder;

a distributor pump downstream from the melt line for receiving an entering main melt flow and having a common drive shaft, the distributor pump comprising a plurality of distribution channels which divide the entering main melt flow into partial melt flows, and a plurality of individual pumps which each receive a partial melt flow from the distribution channels and which each include a planetary shaft driven by the common drive shaft, and a mixing channel in alignment with one of the common drive shaft or a planetary shaft, an upstream portion of which shaft extends into the mixing channel and which portion is provided with mixing elements; and a spinneret downstream of the distributor pump, for spinning a bundle of filaments, which receives a partial melt flow discharged from one of the individual pumps.

2. A spin system as in claim 1 wherein the shaft extending into the mixing channel is the drive shaft.

3. A spin system as in claim 2 wherein the distributor pump further comprises a mixing side adjacent to the mixing channel and an opposite drive side from which the drive shaft is driven.

4. A spin system as in claim 3 wherein the distributor pump further comprises a housing and wherein the mixing channel is defined in part by the housing.

5. A spin system as in claim 1 further comprising a pump block to which the distributor pump is flanged and in which the melt line and the distribution channels extend, and wherein the mixing channel extends at least partly into the pump block.

6. A multiple gear pump for distributing a melt flow of thermoplastic material received from a pressurized melt line, the pump comprising:

a plurality of sets of paired gears mounted on respective planetary shafts;

a common drive shaft in operative connection with each of the planetary shafts;

a mixing chamber for receiving a main melt flow from a melt line; and a plurality of distribution channels extending from the mixing chamber to a respective set of paired gears such that the main melt flow is divided into a plurality of partial melt flows;

wherein one of the common drive shaft or a planetary shaft extends into the mixing chamber and mixes the melt flow before it is divided into the partial melt flows.

7. A multiple gear pump as in claim 6 wherein the shaft extending into the mixing chamber is the common drive shaft.

* * * * *